United States Patent
Golish et al.

(10) Patent No.: US 7,792,271 B2
(45) Date of Patent: Sep. 7, 2010

(54) METHOD AND SYSTEM FOR OPTIMIZING A CONFIGURATION OF CENTRAL OFFICE MEDIATION DEVICES

(75) Inventors: Russell John Golish, Las Vegas, NV (US); Richard Habersham Le Sesne, Chapel Hill, NC (US); Hugh Campbell Thorne, Portland, ME (US); Julian Stuart Williams, Belle Mead, NJ (US)

(73) Assignee: International Business Machines Corporation, Armonk, NY (US)

( * ) Notice: Subject to any disclaimer, the term of this patent is extended or adjusted under 35 U.S.C. 154(b) by 1427 days.

(21) Appl. No.: 11/202,749

(22) Filed: Aug. 11, 2005

(65) Prior Publication Data

US 2007/0041561 A1   Feb. 22, 2007

(51) Int. Cl.
*H04M 3/00* (2006.01)

(52) U.S. Cl. ............... 379/242; 379/88.17; 379/112.05; 379/221.07; 379/279

(58) Field of Classification Search ............... 379/88.17, 379/242, 279, 112.05, 221.07
See application file for complete search history.

(56) References Cited

U.S. PATENT DOCUMENTS 5,875,242 A * 2/1999 Glaser et al. ........... 379/201.05
5,940,373 A * 8/1999 Chiu et al. ................ 370/238
7,562,142 B2 * 7/2009 Nakamura ................ 709/225

* cited by examiner

Primary Examiner—Melur Ramakrishnaiah
Assistant Examiner—Yosef K Laekemariam
(74) Attorney, Agent, or Firm—Schmeiser, Olsen & Watts; John R. Pivnichny

(57) ABSTRACT

A method and system for optimizing a configuration of mediation devices in a telecommunications central office. Specifications associated with mediation devices are provided. A configuration of mediation devices and legacy devices in a central office is generated. A specification is compared to an attribute of a mediation device in the configuration. The attribute is one of: (1) a distance between the mediation device and a legacy device to be connected to the mediation device, (2) an amount of data to be received by the mediation device from one or more legacy devices to be connected to the mediation device, and (3) a count of one or more legacy devices to be connected to the mediation device. The configuration is updated in response to the comparing of the specification to the attribute. The updating of the configuration provides an optimized number of mediation devices.

9 Claims, 13 Drawing Sheets

| 402 | 404 | 406 | 408 | 410 | 412 | 414 | 416 | 418 | 420 | 422 | 424 |
|---|---|---|---|---|---|---|---|---|---|---|---|
| CO ID | CO LEGACY DEVICE | MANUFACTURER | MFG PART NO. | SERIAL NO. | LOCATION | XMIT PROT | CONTROL PROT | INTERFACE SPEC | MAX DIST SPEC | RESILIENCE | DEVICE BANDWIDTH kbps |
| NCCH54 | ATM SWITCH | ALCATEL | 1603 | 23-5667 | X45.1-Y23.5-Z16.7 | BIX.25 | NORTEL | V.24 | 50M | NO | 2.4 |
| NCCH54 | ATM SWITCH | ALCATEL | 1648 | 21-5447 | X14.9-Y23.0-Z18.5 | TTY-NL | LUCENT | V.42 | 100M | YES | 3.6 |
| NCCH54 | OPTICAL MUX | FUJITSU | FLM-600 | 20334 | X22.7-Y23.0-Z19.0 | TL1 | FUJITSU | V.24 | 50M | NO | 2.4 |
| NCCH54 | PBX | LUCENT | SLC-200 | 17-3045 | X34.5-Y23.0-Z21.5 | BIX.25 | BI | V.24 | 50M | NO | 19.2 |
| NCCH54 | ATM SWITCH | ALCATEL | 1603/12SM | 29356 | X05.3-Y14.6-Z22.0 | TL1 | TL1 | V.35 | 50M | NO | 19.2 |

| 502 | 504 | 506 | 508 | 510 | 512 | 514 | 516 | 518 | 520 | 522 | 524 | 526 |
|---|---|---|---|---|---|---|---|---|---|---|---|---|
| CO NAME | CO IDENTIFICATION | CO ADDRESS | CO CITY | CO STATE OR PROVINCE | CO V&H OR GPS COORD | REDUNDANT WAN NETW LINKS? | REDUNDANT WAN CPE? | AUTO WAN BACKUP? | MANUAL WAN BACKUP? | REDUNDANT INTRA-CO NETWORK? | REDUNDANT INTRA-CO CPE? | IP SUBNET |
| NC 54 CHAPEL HILL | NCCH5401 | 1400 NC HWY 54 | CHAPEL HILL | NC | 32.677.34 | N | Y | N | N | Y | Y | 10.4.121-122 |

| CO DEVICE | LEGACY DEV LOCATION | XMIT PROT | CONTROL PROT | INTERFACE SPEC | MAX DIST SPEC | RESILIENCE | DEVICE BANDWIDTH kbps | MEDIATION DEVICE | MEDIATION DEVICE LOCATION | PORT | PORT COUNT CAP | MED DEV BANDWIDTH CAP (kbps) |
|---|---|---|---|---|---|---|---|---|---|---|---|---|
| ALCATEL 1603 | X45.1-Y23.5-Z16.7 | BIX.25 | BIX.25 | V.24 | 50M | NO | 2.4 | CISCO 2611 | X63.4-Y29.0-Z37.0 | 1 | 16 | 72 |
| FLM-600 | X22.7-Y23.0-Z19.0 | TTY-NL | TL1 | V.24 | 100M | YES | 3.6 | CISCO 2611 | X63.4-Y29.0-Z48.0 | 1 | 16 | 307.2 |

*FIG. 6*

METHOD AND SYSTEM FOR OPTIMIZING A CONFIGURATION OF CENTRAL OFFICE MEDIATION DEVICES

BACKGROUND OF THE INVENTION

1. Technical Field

The present invention relates to method and system for optimizing a configuration of devices in a telecommunications central office, and more particularly to a technique for reducing the number of mediation devices in a central office.

2. Related Art

Conventional techniques for configuring a telecommunications central office utilize multiplexed connections from devices being controlled by centralized management systems external to the central office. These known multiplexing techniques increase the amount of connection equipment, which produces increased complexity that results in additional costs. Other conventional techniques add dedicated mediation equipment and communication links to the devices being controlled so that control signals and logic from the devices are converted into Transmission Control Protocol/Internet Protocol (TCP/IP) traffic, which is transmitted to the centralized management systems. The mediation equipment and links are added in piecemeal fashion, without optimizing the central office configuration. The cost of the dedicated equipment and links represents a significant percentage of the operating costs of the central office. Thus, there is a need for an improved technique for optimizing a configuration of a central office.

SUMMARY OF THE INVENTION

In first embodiments, the present invention provides a method of optimizing a configuration of a plurality of devices in a central office, the method comprising:

obtaining a plurality of specifications, each specification being associated with a mediation device of a plurality of mediation devices;

generating a configuration of said plurality of mediation devices and a plurality of legacy devices in a central office;

comparing a specification of said plurality of specifications to an attribute of a mediation device of said plurality of mediation devices, said attribute selected from the group consisting of:

a distance between a legacy device of said plurality of legacy devices and said mediation device, said legacy device to be connected to said mediation device in said configuration, an amount of data to be received by said mediation device from at least one legacy device of said plurality of legacy devices, said at least one legacy device to be connected to said mediation device in said configuration, and a count of said at least one legacy device to be connected to said mediation device in said configuration; and updating said configuration responsive to said comparing, wherein said updating provides an optimized number of mediation devices in said plurality of mediation devices.

In second embodiments, the present invention provides a system for optimizing a configuration of a plurality of devices in a central office, comprising:

means for obtaining a plurality of specifications, each specification being associated with a mediation device of a plurality of mediation devices;

means for generating a configuration of said plurality of mediation devices and a plurality of legacy devices in a central office;

means for comparing a specification of said plurality of specifications to an attribute of a mediation device of said plurality of mediation devices, said attribute selected from the group consisting of:

a distance between a legacy device of said plurality of legacy devices and said mediation device, said legacy device to be connected to said mediation device in said configuration, an amount of data to be received by said mediation device from at least one legacy device of said plurality of legacy devices, said at least one legacy device to be connected to said mediation device in said configuration, and a count of said at least one legacy device to be connected to said mediation device in said configuration; and means for updating said configuration responsive to said comparing, wherein said updating facilitates providing an optimized number of mediation devices in said plurality of mediation devices.

In third embodiments, the present invention provides at least one program storage device readable by a machine, tangibly embodying at least one program of instructions executable by the machine to perform a method of optimizing a configuration of a plurality of devices in a central office, comprising:

obtaining a plurality of specifications, each specification being associated with a mediation device of a plurality of mediation devices;

generating a configuration of said plurality of mediation devices and a plurality of legacy devices in a central office;

comparing a specification of said plurality of specifications to an attribute of a mediation device of said plurality of mediation devices, said attribute selected from the group consisting of:

a distance between a legacy device of said plurality of legacy devices and said mediation device, said legacy device to be connected to said mediation device in said configuration, an amount of data to be received by said mediation device from at least one legacy device of said plurality of legacy devices, said at least one legacy device to be connected to said mediation device in said configuration, and a count of said at least one legacy device to be connected to said mediation device in said configuration; and updating said configuration responsive to said comparing, wherein said updating facilitates providing an optimized number of mediation devices in said plurality of mediation devices.

In fourth embodiments, the present invention provides a method for deploying computing infrastructure, comprising integrating computer-readable code into a computing system, wherein the code in combination with the computing system is capable of performing a process of optimizing a configuration of a plurality of devices in a central office, the process comprising:

obtaining a plurality of specifications, each specification being associated with a mediation device of a plurality of mediation devices;

generating a configuration of said plurality of mediation devices and a plurality of legacy devices in a central office;

comparing a specification of said plurality of specifications to an attribute of a mediation device of said plurality of mediation devices, said attribute selected from the group consisting of:

a distance between a legacy device of said plurality of legacy devices and said mediation device, said legacy device to be connected to said mediation device in said configuration, an amount of data to be received by said mediation device from at least one legacy device of said plurality of legacy devices, said at least one legacy device to be connected to said mediation device in said configuration, and a count of said at least one legacy device to be connected to said mediation device in said configuration; and updating said configuration responsive to said comparing, wherein said updating facilitates providing an optimized number of mediation devices in said plurality of mediation devices.

Advantageously, the present invention provides a systematic, repeatable, and documented series of decisions that facilitate the modernization of control of telecommunications operations by optimizing the number of devices and the number of communications links in a central office, thereby reducing central office costs of equipment and links. Further, the technique provided by the present invention can be used independently from the technologies used to achieve mediation.

BRIEF DESCRIPTION OF THE DRAWINGS

FIG. 4 depicts a graphical matrix diagram which organizes an inventory of central office legacy devices to be mediated, which is acquired in the optimization process in FIG. 3, in accordance with embodiments of the present invention.

FIG. 5 depicts an organizational diagram of network resiliency requirements which are acquired in the optimization process in FIG. 3, in accordance with embodiments of the present invention.

FIG. 6 depicts a matrix of central office legacy devices and mediation options, which is generated in the optimization process in FIG. 3, in accordance with embodiments of the present invention.

DETAILED DESCRIPTION OF THE INVENTION

Definitions

Figure 1A:
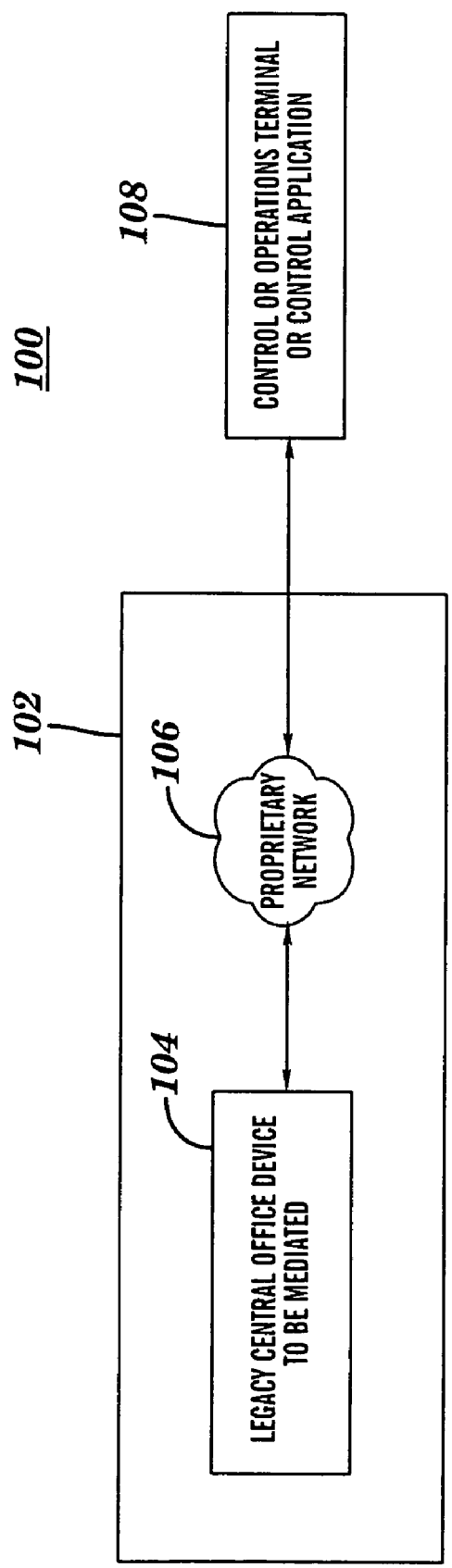
FIG. 1A is a block diagram of an unmediated legacy device in a central office communicating with controlling equipment via a proprietary network, in accordance with embodiments of the present invention.

Central office (CO): a telecommunications service provider's switching center (e.g., a building), which houses switching and related equipment.

Configuration: the number and placement of mediation devices and legacy devices in a central office, as well as connections between the devices.

Customer Premises Equipment (CPE): telecommunications equipment that resides on a customer's premises.

Legacy devices: Devices that existed in a central office (CO) prior to the mediation of the CO, and which do not support an open and standards-based network protocol (e.g., TCP/IP). After adding mediation devices to the CO, one or more of the legacy devices are connected via communication links to each of the mediation devices. A legacy device connected to a mediation device is also known as a mediated device. One or more of the mediation devices can be connected to each of the legacy devices in the CO.

Mediation device (or mediating device): a device in a CO that routes or acts on information passing between elements of a telecommunications system, and whose specific functions include at least protocol conversion, and may also include communications control, data handling, communication of primitives, decision-making processing, and data storage.

Optimizing a configuration: reducing the number of mediation devices required to operate in a CO, or minimizing the increase in a number of mediation devices in a CO, or limiting that increase to less than a specified amount. The number of mediation devices resulting from optimizing a CO configuration is defined to be an optimal number of mediation devices.

Protocol conversion: functionality that allows a mediation device to convert a data stream between the protocol of a proprietary network (e.g., an asynchronous TTY-type protocol) and the protocol of an open and standards-based network (e.g., TCP/IP).

Switching equipment: equipment that routes communications traffic from an originating point to a destination point in a telecommunications system.

Telecommunications service provider: an entity providing telecommunications services such as telephone, cable, wireless and/or Internet services.

The present invention provides a process for optimizing the number of specified devices in the configuration of a telecommunications central office (CO). The process receives and organizes specifications (i.e., technical requirements) associated with devices configured in a CO, and systematically performs a repeatable series of comparisons between the specifications and specific attributes associated with the CO configuration. These attributes are described in detail below. Each comparison determines whether a specified device can be added to, deleted from or moved within the CO. By updating the CO configuration based on the series of comparisons, the number of specified devices in the configuration is optimized.

In one embodiment, the present invention optimizes the configuration of a CO as the CO is being reconfigured to utilize mediation devices (a.k.a. mediating devices) to mediate legacy devices. Two views of central office configurations prior to utilizing mediation devices are depicted in FIGS. 1A and 1B.

FIG. 1A is a block diagram of a single legacy device, prior to mediation, communicating with controlling equipment via a proprietary network, in accordance with embodiments of the present invention. A portion of a telecommunications system 100 includes a central office 102. Central office 102 includes an unmediated device 104 (e.g., a large Public Business exchange or PBX) communicating via proprietary network 106. Control or operations terminal 108 controls legacy device 104 via proprietary network 106. Alternatively, control or operations terminal 108 can be a control application (e.g., a software application providing control functionality).

Figure 1B:
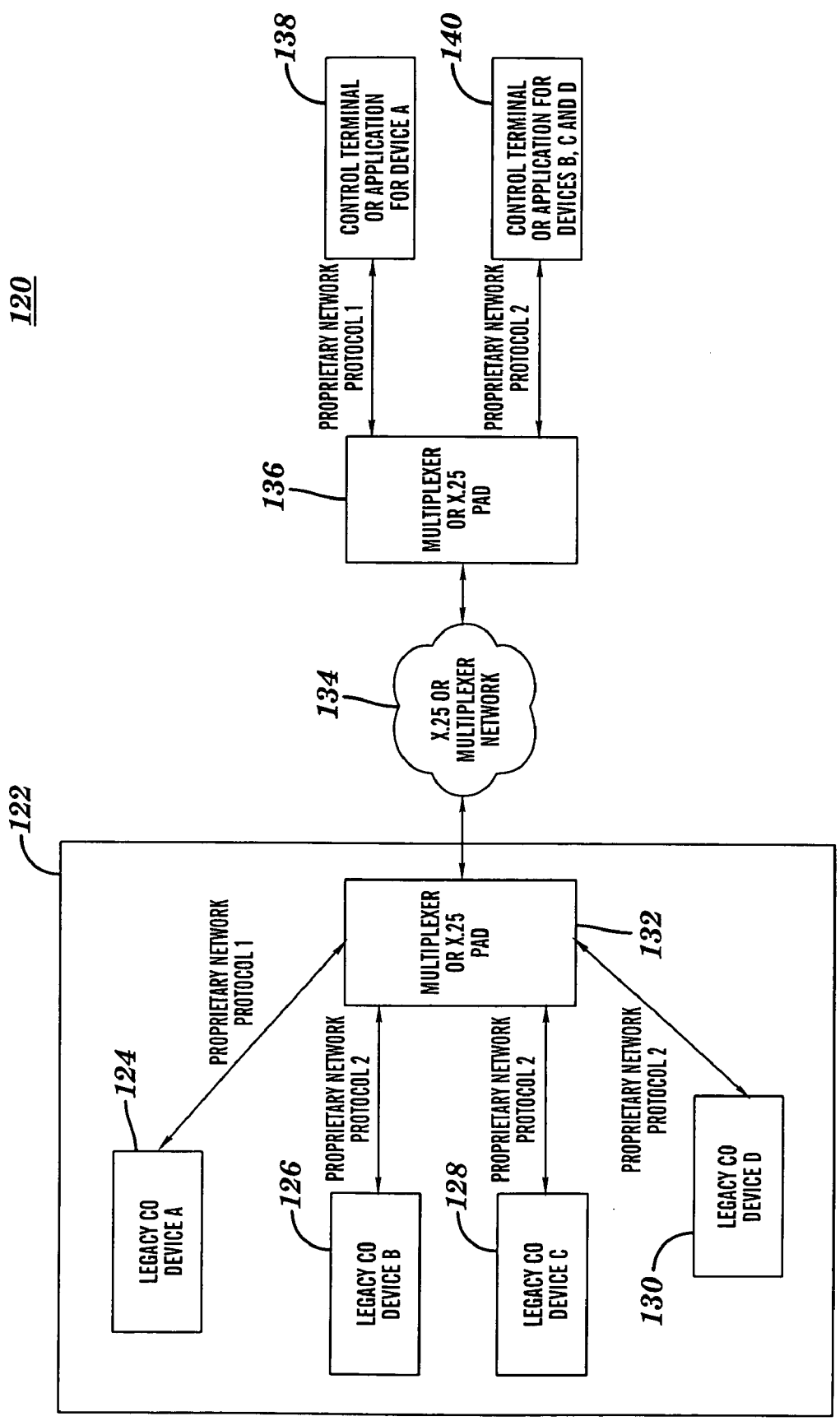
FIG. 1B is a block diagram of multiple unmediated legacy devices in a central office communicating with controlling equipment via a wide area network, in accordance with embodiments of the present invention.

A view of multiple legacy devices prior to mediation is depicted in FIG. 1B, which is a block diagram of multiple unmediated legacy devices in a central office communicating with controlling equipment via a wide area network, in accordance with embodiments of the present invention. A portion of a telecommunications system 120 includes a central office 122, which includes legacy devices (e.g., PBX) 124, 126, 128, 130. Data from legacy device 124 employs, for example, a first proprietary network protocol, and is transmitted via multiplexer or X.25 Packet Assembler Disassembler (PAD) 132, multiplexer or X.25 wide area network 134, and multiplexer (or X.25 PAD) 136 to control terminal 138. Alternatively, control terminal 138 is an operations terminal or a control application. Control terminal 138 is capable of receiving and sending data using the first proprietary network protocol. In this example, legacy devices 126, 128, and 130 transmit data with a second proprietary network protocol, which is routed through multiplexer 132, multiplexer network 134, and multiplexer 136 to control terminal 140. Control terminal 140 can also be an operations terminal or a control application. Control terminal 140 is capable of receiving and sending data using the second proprietary network protocol.

Mediation of a CO (i.e., connecting mediation devices to legacy devices in a CO) is an alternative to the multiplexing shown in FIG. 1B. Mediated COs that include mediated devices (i.e., legacy devices that are mediated by mediation devices) are shown in FIGS. 2A-2D. The present invention provides a process described below to optimize the number of mediation devices to facilitate the reduction of costs of the mediation devices and the communication links that connect legacy devices to mediation devices.

Figure 2A:
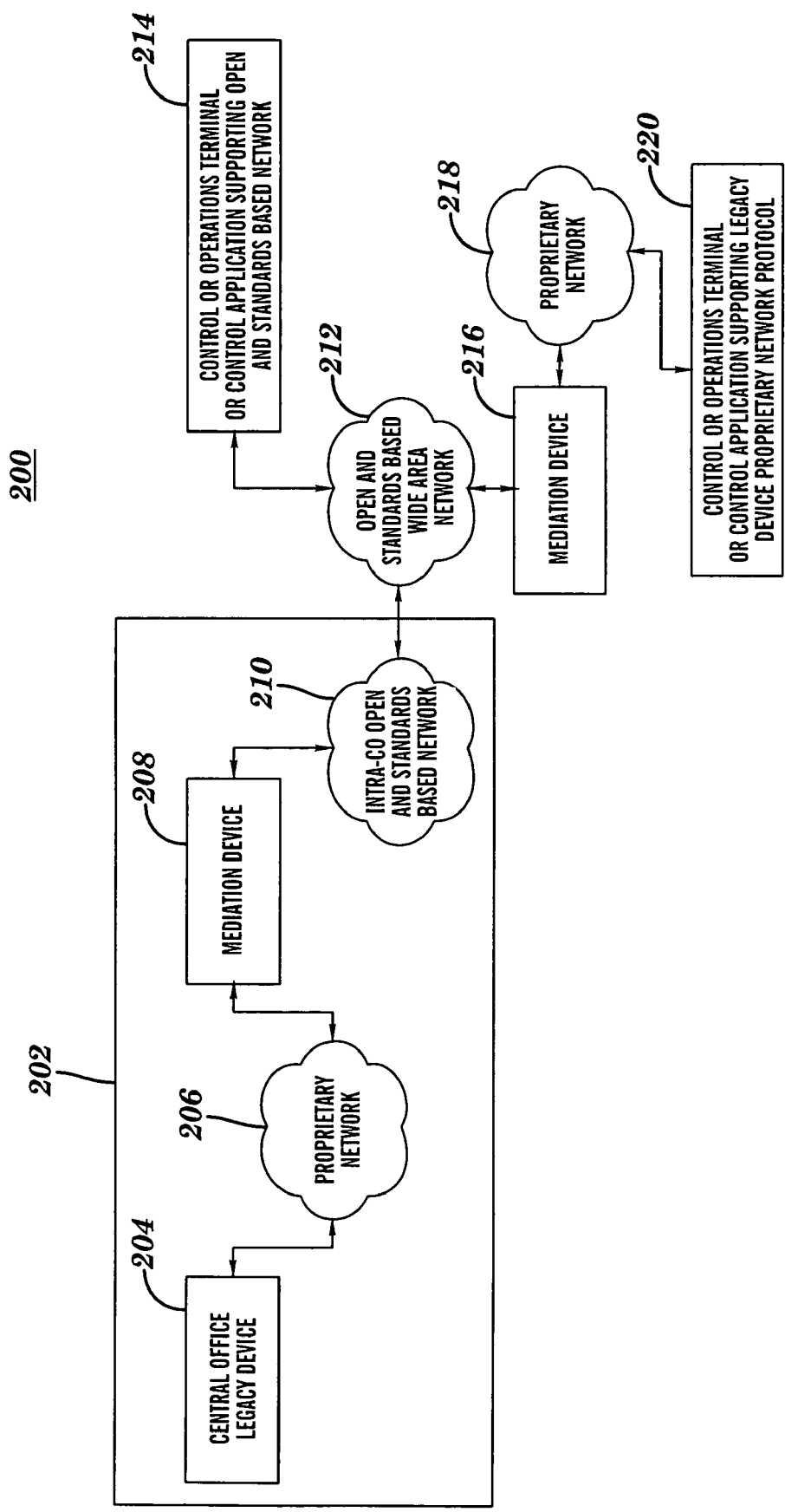
FIG. 2A is a block diagram of a mediated central office legacy device communicating via open and standards-based networks, in accordance with embodiments of the present invention.

FIG. 2A is a block diagram of a mediated central office legacy device communicating via open and standards-based networks, in accordance with embodiments of the present invention. In this example of a portion of a telecommunications system 200, a central office 202 includes a legacy device 204 connected via a proprietary network 206 to a mediation device 208. Mediation device 208 converts data between a proprietary network protocol and an open and standards-based network protocol (e.g. TCP/IP). As used herein, an open and standards-based network protocol is a non-proprietary protocol that is based on industry standards. Data from legacy device 204 is transmitted via proprietary network 206 to mediation device 208, and then via an open and standards-based network 210 and an open and standards-based wide area network 212 to a control or operations terminal 214. Control or operations terminal 214 supports the open and standards-based network protocol supported by mediation device 208. As an alternative, control terminal 214 can be a control application. Further, network 210 is internal to the CO (i.e., an intra-CO network) and network 212 is external to the CO.

A reverse protocol conversion external to central office 202 is also shown in FIG. 2A. In the reverse protocol conversion, data conforming to an open and standards-based network protocol is transferred via open and standards-based wide area network 212 to a mediation device 216, which converts the data to a proprietary network protocol, which is supported by proprietary network 218. The converted data is transmitted via proprietary network 218 to a control terminal 220, which supports the proprietary network protocol.

Figure 2B:
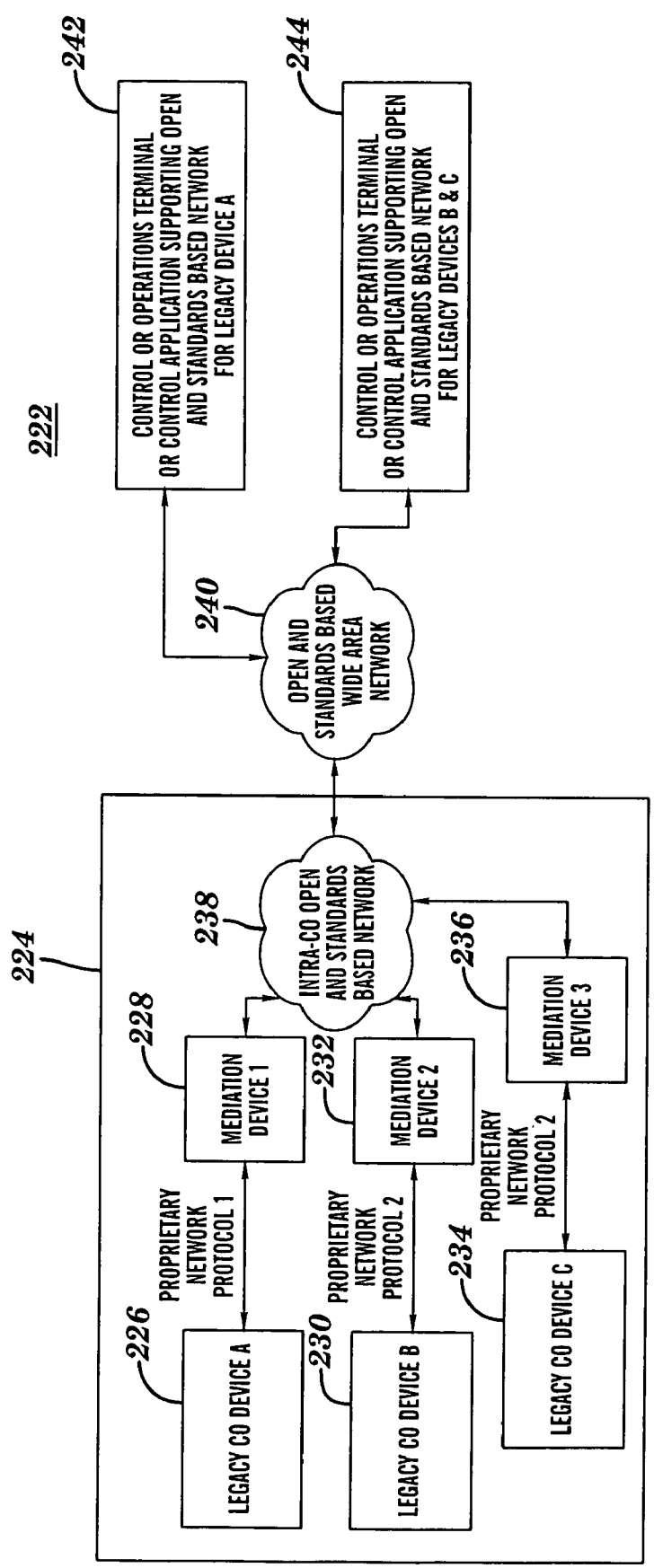
FIG. 2B is a block diagram of multiple mediated central office legacy devices communicating via mediation devices and open and standards-based networks prior to optimization of the mediation devices, in accordance with embodiments of the present invention.

FIG. 2B is a block diagram of multiple mediated central office legacy devices communicating via mediation devices and open and standards-based networks prior to optimization of the mediation devices, in accordance with embodiments of the present invention. In another example of a portion of a telecommunications system 222, central office 224 includes multiple legacy devices 226, 230, 234 connected to multiple mediation devices 228, 232, 236, respectively. Each of the legacy device-to-mediation device connections employs a separate proprietary network (not shown). Mediation devices 228, 232, 236 convert data between a proprietary network protocol to an open and standards-based network protocol (e.g., TCP/IP). Data is exchanged between mediation devices 228, 232, 236 and control terminals 242, 244 via an open and standards-based network 238 internal to central office 224 (e.g., Ethernet LAN employing TCP/IP) and an open and standards-based network 240 external to the CO (e.g., wide area network employing TCP/IP). Control terminal 242 supports the open and standards-based protocol associated with networks 238, 240, and controls legacy device 226. Control terminal 244 similarly supports the open and standards-based protocol, and controls legacy devices 230, 234.

Figure 2C:
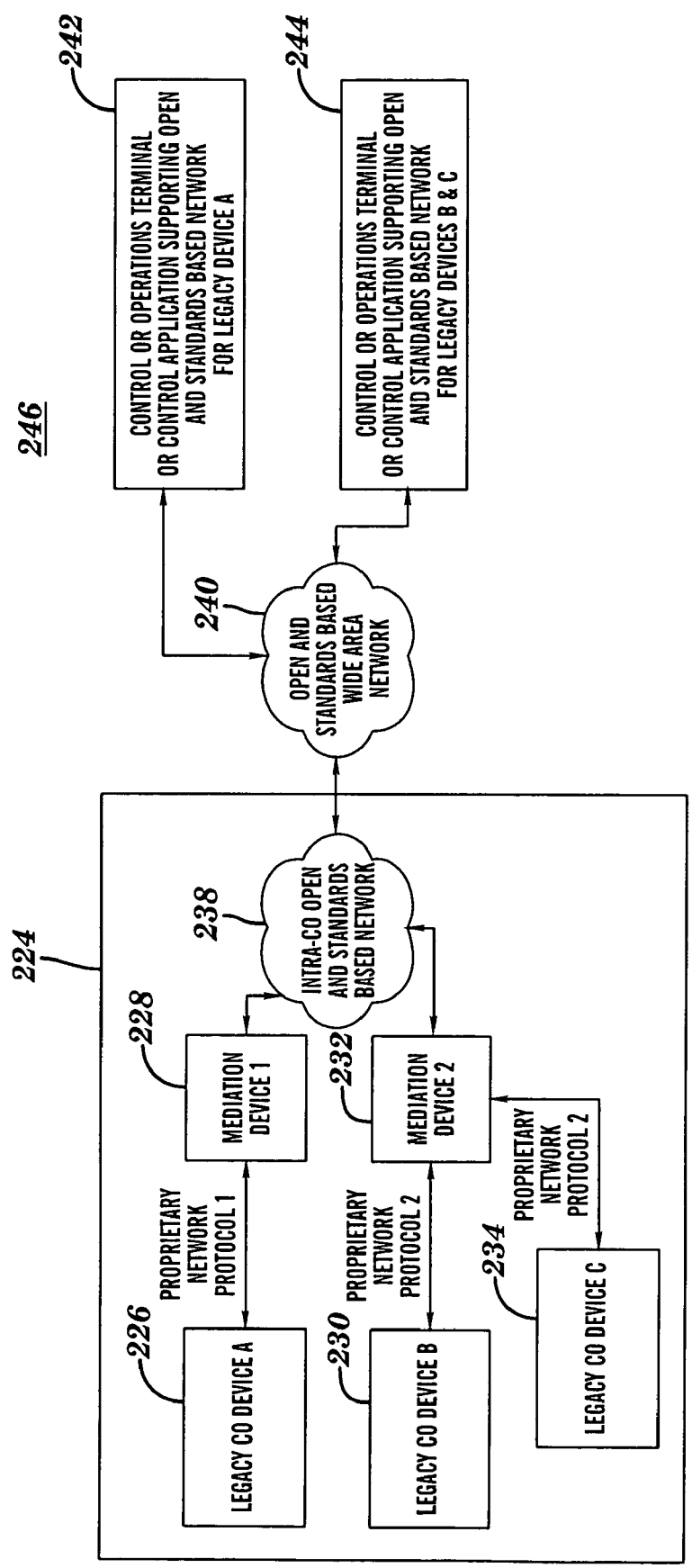
FIG. 2C is a block diagram of multiple mediated central office legacy devices communicating via mediation devices and open and standards-based networks subsequent to a first optimization of the mediation devices in FIG. 2B, in accordance with embodiments of the present invention.

FIG. 2C is a block diagram of multiple mediated central office legacy devices communicating via mediation devices and open and standards-based networks subsequent to a first optimization of the mediation devices in FIG. 2B, in accordance with embodiments of the present invention. One example of updating the configuration of central office 224 in FIG. 2B is the deletion of a mediation device while changing the connection of a legacy device formerly connected to the deleted mediation device to an existing mediation device. For example, in telecommunications system 246 of FIG. 2C, the configuration of CO 224 is an update of the CO in FIG. 2B. In particular, mediation device 236 (see FIG. 2B) is deleted and not included in CO 224 of FIG. 2C, and legacy device 234 is connected to mediation device 232 (instead of being connected to mediation device 236, as in FIG. 2B). Mediation device 232 is also connected to legacy device 230. This deletion of a mediation device is possible, for example, when certain attributes associated with mediation device 232 satisfy corresponding specifications of mediation device 232. The comparison of such attributes to specifications is described below with respect to FIGS. 7A-7B.

Similar to FIG. 2B, legacy device 226 in FIG. 2C is connected to mediation device 228, and each of the connections between the legacy devices and the mediation devices employ a separate proprietary network (not shown). Further, in FIG. 2C data is exchanged between mediation devices 228, 232 and control terminals 242, 244, via open and standards-based network 238 and open and standards-based wide area network (WAN) 240.

FIG. 2C is only one example of the number of legacy devices that can be connected to each mediation device. In typical CO configurations, the number of legacy devices can be scaled upwards significantly. For example, a single CO can include ten mediation devices and hundreds of legacy devices associated with hundreds of different protocols, where each mediation device is connected to multiple legacy devices.

As the number of legacy devices connected to each mediation device is scaled upwards, the configuration of a CO is a hub-and-spoke design where the mediation devices are the hubs and the connections thereto from multiple legacy devices are the spokes. The hubs provide protocol conversion in multiple locations throughout the CO, and the data stream transmitted via each hub is carried over a single LAN within the CO. The hub-and-spoke technique of the present invention allows wide-ranging scaling of facility size or amount of communications traffic without a proportional cost increase related to network interfaces. Further, this hub-and-spoke technique is an alternative to the conventional technique of multiplexing, which is shown in FIG. 1B.

Figure 2D:
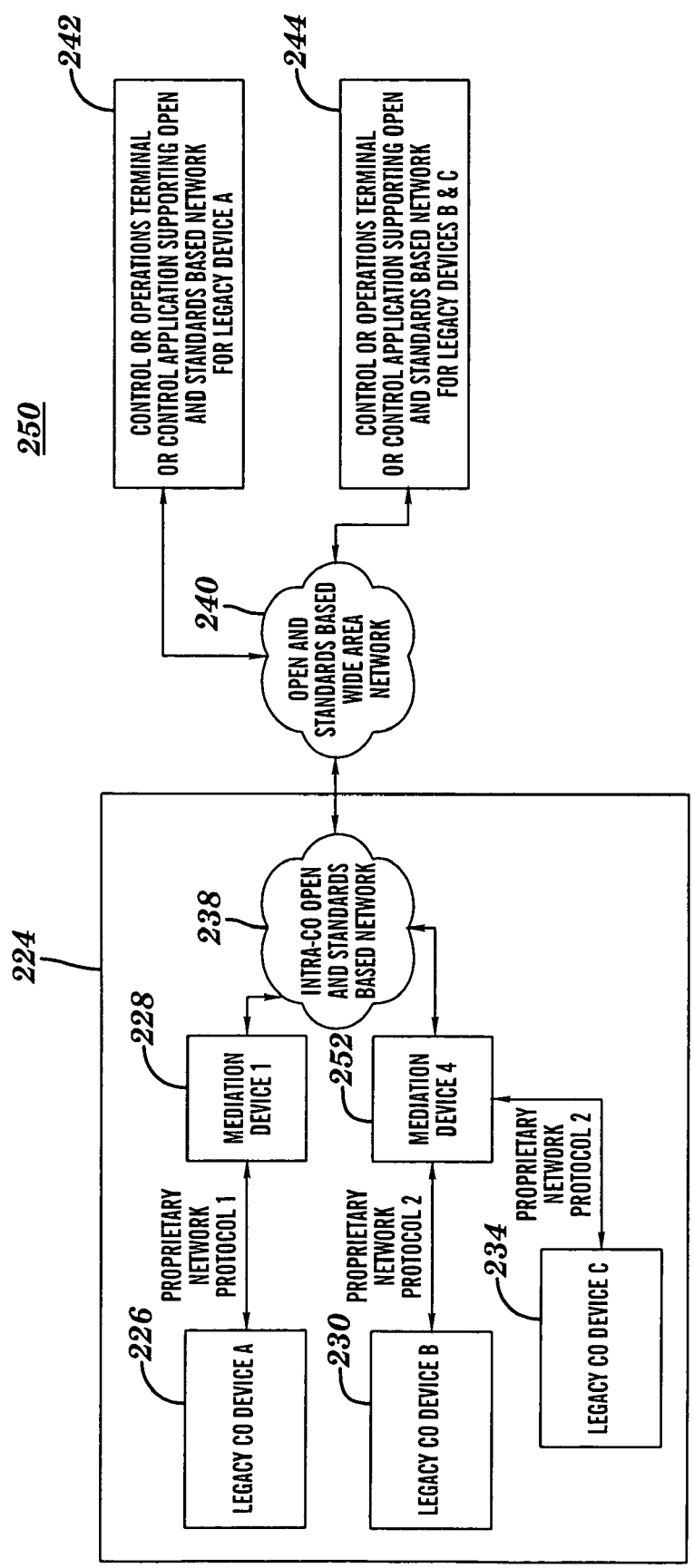
FIG. 2D is a block diagram of multiple mediated central office legacy devices communicating via mediation devices and open and standards-based networks subsequent to a second optimization of the mediation devices in FIG. 2B, in accordance with embodiments of the present invention.

FIG. 2D is a block diagram of multiple mediated central office legacy devices communicating via mediation devices and open and standards-based networks subsequent to a second optimization of the mediation devices in FIG. 2B, in accordance with embodiments of the present invention. FIG. 2D illustrates telecommunications system 250, which depicts an update of the configuration of central office 224, as compared to FIG. 2B. In FIG. 2D, mediation devices 232 and 236 (see FIG. 2B) are not included, since an update of the CO configuration has deleted mediation devices 232, 236. The update of the CO configuration also added mediation device 252, which is connected to legacy devices 230 and 234. This deletion of two mediation devices and the addition of one new mediation device is possible, for instance, based on a comparison between attributes and specifications associated with mediation device 252. The comparison of such attributes to specifications is described below with respect to FIGS. 7A-7B.

Similar to FIG. 2B, legacy device 226 in FIG. 2D is connected to mediation device 228, and each of the connections between the legacy devices and the mediation devices employ a separate proprietary network (not shown). Further, in FIG. 2D data is exchanged between mediation devices 228, 252 and control terminals 242, 244, via open and standards-based network 238 and open and standards-based WAN 240.

Each control terminal in FIGS. 1A, 1B, 2A, 2B, 2C and 2D can alternatively be an operations terminal or a control application (e.g., a software application providing control functionality).

Figure 3:
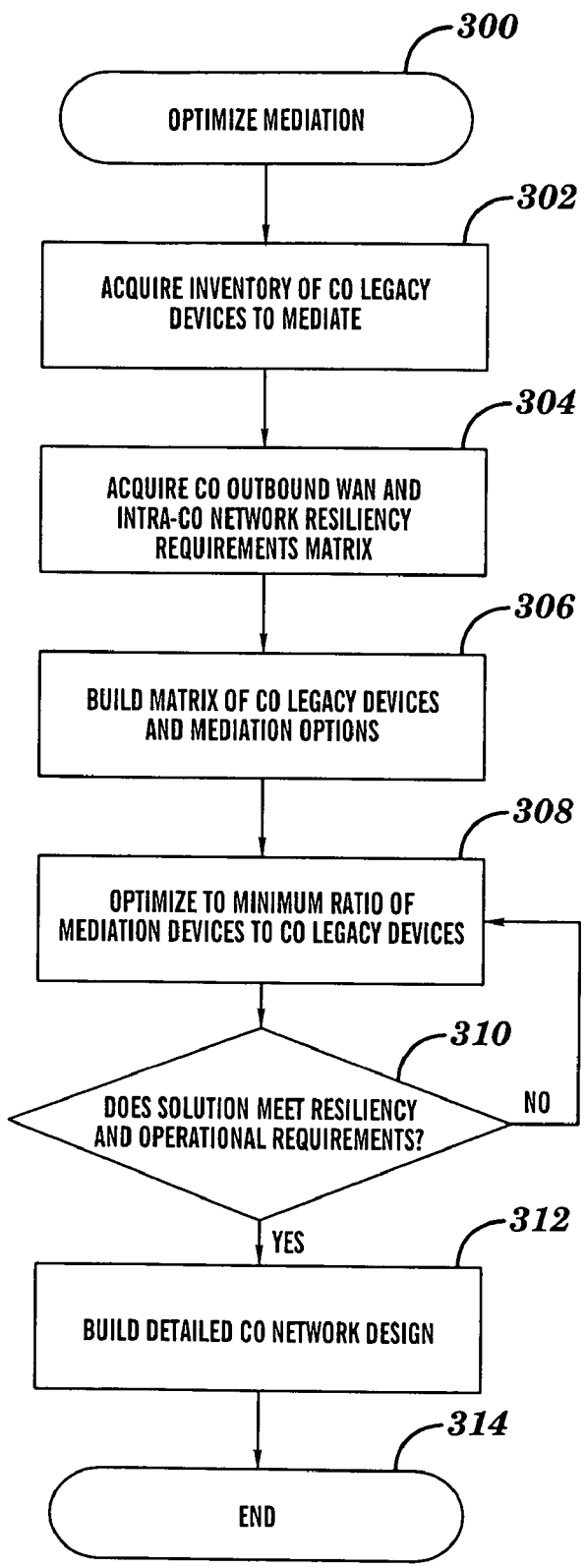
FIG. 3 is a flow chart showing an overview of a central office mediation optimization process, which can include the optimizations shown in FIGS. 2C and 2D, in accordance with embodiments of the present invention.

FIG. 3 is a flow chart showing an overview of a optimization process for central office mediation, which can include the optimizations shown in FIGS. 2C and 2D, in accordance with embodiments of the present invention. The optimization process begins in step 300 followed by acquiring an inventory of CO legacy devices in step 302 which do not support an open and standards-based protocol such as TCP/IP. These legacy devices are the CO devices to be mediated. The inventory acquired in step 302 is described in detail in the discussion below relative to FIG. 4. In an alternate embodiment, the optimization process starts with no existing legacy devices and designs an optimized CO configuration from scratch.

In step 304, resiliency requirements are acquired for a network internal to the CO and a WAN external to the CO. These resiliency requirements are compiled in, for example, a resiliency requirements matrix in a spreadsheet. This resiliency requirements matrix is described in detail in the discussion below relative to FIG. 5. In step 306, CO legacy devices, their characteristics, and options to mediate the legacy devices are compiled in, for example, a device matrix in a spreadsheet. The discussion below relative to FIG. 6 describes this device matrix in detail.

In step 308, the optimization of the configuration of the central office is performed. This optimization includes the optimization of the number of mediation devices in the central office. The optimization of the number of mediation devices results in the optimization of the amount of communication link wiring needed in the central office and a minimization of the ratio of the number of mediation devices to the number of legacy devices in the CO. At step 308, the placement of legacy devices and the placement of mediation devices in the CO are also determined to optimize the number of mediation devices. This optimization process is described in detail in the steps of the flowcharts shown in FIGS. 7A & 7B.

In inquiry step 310, a final "sanity check" is performed, determining whether the solution derived from the optimization in step 308 meets the resiliency and operational requirements of step 304 and step 306, respectively. If these requirements are not satisfied, step 308 is repeated. If these requirements are satisfied, the detailed CO network configuration designed by the optimization of step 308 is built in step 312 and the overview optimization process ends in step 314.

FIG. 4 depicts a graphical matrix diagram which organizes an inventory of central office legacy devices to be mediated, which is acquired in the optimization process in FIG. 3, in accordance with embodiments of the present invention. Matrix 400 includes an inventory of information acquired in step 302 (see FIG. 3) and associated with CO legacy devices to be mediated. Column CO ID 402 includes codes identifying specific CO legacy devices. Column CO Legacy Device 404 includes a name and column 406 includes the manufacturer of the legacy device to be mediated. Column 408 includes a part number and column 410 includes a serial number of the legacy devices to be mediated. Column 412 includes coordinates designating a position of a each legacy device within the central office. Examples of coordinates in this column include three-dimensional X,Y,Z coordinates and GPS coordinates. Column 414 is the transmission protocol and column 416 is the control protocol of the legacy devices to be mediated. The interface specification of each legacy device is included in column 418. The protocols in columns 414, 416 and the interface specification in column 418 facilitate determining the type of mediation device that is capable of being connected to each legacy device listed in matrix 400. A maximum distance specification is in column 420. The maximum distance is the maximum length of a communication link that can be connected to the corresponding legacy device. Column 422 indicates whether or not resiliency (i.e., the ability to recover from failure) is required for the legacy device. Column 424 includes the peak bandwidth in kilobits per second that the legacy device can transmit.

FIG. 5 depicts an organizational diagram of network resiliency requirements which are acquired in the optimization process in FIG. 3, in accordance with embodiments of the present invention. Table 500 includes information obtained in step 304 (see FIG. 3) which identifies central office 224 (see FIG. 2B) and provides requirements regarding intra-CO network 238 (see FIG. 2B) and wide area network 240 (see FIG. 2B). Table 500 identifies the CO by its name, identification code, street address, city, state (or province), and coordinates (see columns 502, 504, 506, 508, 510, and 512, respectively). The coordinates of the CO are, for example, the standard telecommunications "vertical and horizontal" (V&H) coordinates or Global Positioning System (GPS) coordinates. Network requirements indicate whether the design of WAN 240 (see FIG. 2B) has redundant communication links, redundant Customer Premises Equipment (CPE), and automatic backup or manual backup features (see columns 514, 516, 518, 520, respectively). Further, network requirements indicate if the design of intra-CO network 238 (see FIG. 2B) includes redundant network links or redundant CPE (see columns 522 and 524, respectively). IP subnet column 526 indicates the IP address range associated with the CO identified in table 500.

FIG. 6 depicts a matrix of central office legacy devices and mediation options, which is generated in the optimization process in FIG. 3, in accordance with embodiments of the present invention. Matrix 600 is built in step 306 (see FIG. 3) and includes CO legacy device information along with mediation options for each legacy device to be mediated. On each row of matrix 600, CO legacy device information includes a description of a legacy device to be mediated, along with a location, transmission protocol, control protocol, interface specification, maximum distance specification, resilience, and peak bandwidth associated with the legacy device (see columns 602, 604, 606, 608, 610, 612, 614 and 616, respectively). Further descriptions of columns 604-616 are provided above relative to analogous columns 412-424 of matrix 400 in FIG. 4. The mediation options to be applied to the legacy device of a row in matrix 600 include a description of a mediation device to mediate the legacy device, a location of the mediation device, a number of ports of the mediation device being used to link to one or more legacy devices, a port count capacity indicating the maximum number of ports that can be used for links, and a bandwidth capacity indicating the maximum amount of data (e.g., in kbps) that the mediation device is capable of receiving via any number of its ports simultaneously (see columns 618, 620, 622, 624 and 626, respectively).

Figure 7A:
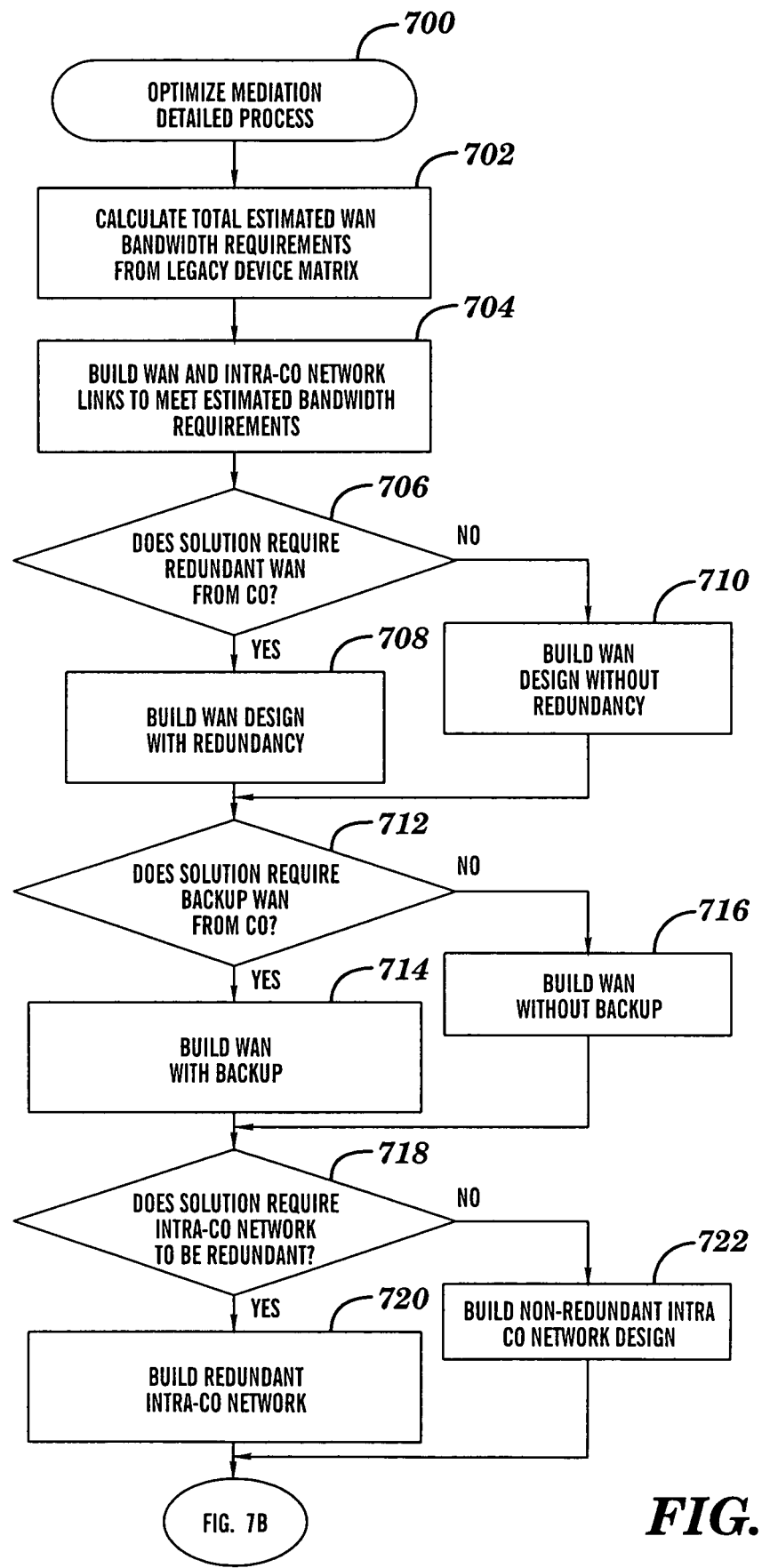
FIGS. 7A & 7B depict a detailed flow chart of a process of optimizing a number of mediation devices, which is included in the optimization process in FIG. 3, in accordance with embodiments of the present invention.
Figure 7B:
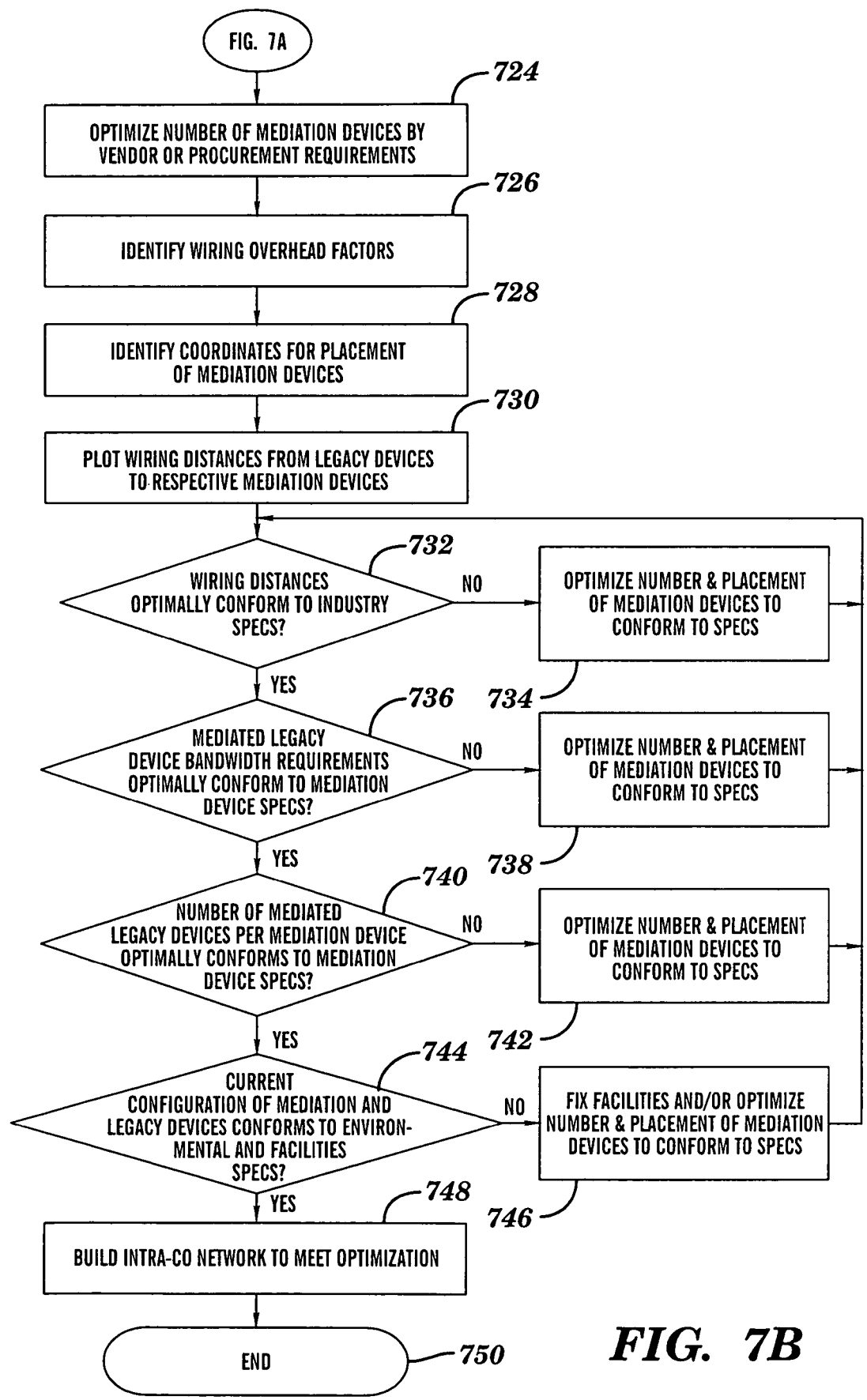

FIGS. 7A and 7B depict a detailed flow chart of a process of optimizing a number of mediation devices, which is included in the optimization process in FIG. 3, in accordance with embodiments of the present invention. In FIG. 7A, the optimizing process begins in step 700, followed by the calculation in step 702 of a total of estimated WAN bandwidth requirements associated with legacy devices to be mediated. An estimated WAN bandwidth is a peak bandwidth or maximum amount of data expected to be sent from the legacy devices. The estimated WAN bandwidth requirement is acquired from, for example, the Device Bandwidth column of the inventory of legacy devices (see column 424 in FIG. 4) or the Device Bandwidth column of the legacy device matrix (see column 616 in FIG. 6). The total estimated WAN bandwidth is calculated by, for example, summing the values in column 424 (see FIG. 4) or the values in column 616 (see FIG. 6). In FIG. 4, for instance, the total estimated WAN bandwidth requirement for the five legacy devices listed is 46.8 kbps, which is the sum of the values the device bandwidth column (i.e., 2.4+3.6+2.4+19.2+19.2).

In step 704, the WAN and intra-CO network are designed or built to satisfy the total estimated bandwidth requirement calculated in step 702. Under certain extreme conditions, all or substantially all mediated legacy devices send data simultaneously to the intra-CO network. Thus, both the intra-CO network and the WAN are designed to accommodate reception of the total amount of data sent by the mediated legacy devices under these extreme conditions (i.e., the total estimated WAN bandwidth).

If inquiry step 706 determines that the WAN is to be designed with redundancy, then the WAN is designed with redundancy in step 708; otherwise, the WAN is designed without redundancy in step 710. As used herein, network redundancy provides active, redundant communication links to avoid loss of operational efficiency of the network when one link becomes inactive. For example, redundancy avoids any delay from recovering when the network experiences a failed link.

If inquiry step 712 determines that the WAN is to be designed with backup, then the WAN is designed with backup in step 714; otherwise, the WAN is designed without backup in step 716. As used herein, a network designed with backup provides a recovery procedure that is activated upon failure of a component of the network. The recovery procedure includes, for instance, activating a switch that obtains a desired connection to recover from a failed communication link. Unlike the redundancy feature described above, using the backup feature to recover from a network failure includes a delay.

If inquiry step 718 determines that the intra-CO network is to be designed with redundancy, then the intra-CO network is designed with redundancy in step 720; otherwise, the intra-CO network is designed without redundancy in step 722. In inquiry steps 706, 712 and 718, their respective determinations described above are made by, for example, a customer for whom the CO and WAN are being designed.

The mediation optimization process that begins in FIG. 7A continues in FIG. 7B. In step 724, the number of mediation devices is optimized by vendor and/or procurement requirements. As one example of optimizing by vendor, two legacy devices are to be mediated by two different mediation devices X and Y, as indicated in a device matrix similar to matrix 600 (see FIG. 6). Since, in this example, a vendor can supply one mediation device Z that is capable of mediating both of the legacy devices, the two different mediation devices X and Y are replaced by mediation device Z to facilitate optimization of the number of mediation devices in the CO. Continuing this example by adding optimizing by procurement requirements, an optimal number of mediation devices in a CO is constrained by the cost of purchasing the mediation devices. If the cost of purchasing both mediation devices X and Y is less than the cost of purchasing mediation device Z, then mediation devices X and Y are not replaced by mediation device Z.

In step 726, wiring overhead factors are identified. Each of these overhead factors is a "fudge factor" added to a calculated straight line distance between a mediation device and a legacy device the mediation device is configured to mediate. The fudge factor (e.g., a percentage of a calculated straight line distance) is added to the straight line distance to calculate a length of wiring (a.k.a. cabling) for a communication link between the mediation device and the legacy device. The fudge factor is selected to provide a calculated wiring distance (including the fudge factor) that is sufficient to connect the mediation device and the legacy device, taking into account the need for wiring to be configured in shapes other than a straight line (e.g., placing wiring around a curve).

In step 728, the coordinates for placement in the CO of mediation devices listed in matrix 600 (see FIG. 6) are identified. These coordinates are, for example, GPS coordinates or X,Y,Z coordinates representing points in three-dimensional space, where the origin is, for instance, a predetermined point in the CO. The placement of mediation devices in the CO is constrained by locations of equipment racks in the CO, and the availability of space within the racks. The locations of the racks are dependent upon Network Equipment Building System (NEBS) standards. The mediation devices are configured in a design or physically placed in the CO according to the coordinates identified in step 728.

In step 730, the coordinates identified in step 728 and the legacy device location coordinates (see, e.g., column 604 in FIG. 6) are used to determine wiring distances between each mediated legacy device and the mediation device that mediates it. Step 730 also adjusts the wiring distances based on the wiring overhead factors identified in step 726.

Inquiry step 732 determines if the adjusted wiring distances optimally conform to industry specifications. These specifications are the maximum distance (a.k.a. maximum length) specifications in device matrix 600 (see column 612 in FIG. 6). As used herein, "optimally conform" and its variants are associated with a particular attribute related to a selected configuration of mediation devices in a CO and an industry specification that provides a limitation or requirement associated with the attribute. An attribute that optimally conforms to (or is in optimal conformance with) an industry specification is defined as an attribute that satisfies the limitation or requirement provided by the specification while providing an optimal number of mediation devices in the CO configuration. As used herein, providing an optimal number of mediation devices is defined as reducing (and preferably minimizing) the number of mediation devices in the CO, or if increasing the number of mediation devices is necessary, keeping that increase to a minimum, or at least below a specified amount.

Calculating the aforementioned minimum increase in mediation devices is based on the number of ports on each mediation device. For example, if mediation devices are being added to a CO configuration and 100 legacy devices exist in a CO configuration being mediated by mediation devices that each have 5 ports, then the minimum increase in the number of mediation devices is the number of legacy devices divided by the number of ports on each mediation device (i.e., 100/5 or 20 mediation devices). As an alternate to attempting to minimize the increase in this example, the number of added mediation devices can be specified to be below a number greater than the calculated minimum increase in mediation devices.

In inquiry step 732, the attribute and specification associated with optimal conformance are the above-described adjusted wiring distance and maximum length (i.e., maximum distance), respectively. If any of the adjusted wiring distances do not optimally conform to the corresponding maximum length specification, then step 734 optimizes the number and/or placement of a mediation device to conform to the corresponding maximum length specification. For example, in the CO configuration in FIG. 2B, the wiring distance from legacy device 230 to mediation device 232 is calculated to be 15 m, wiring distance from legacy device 234 to mediation device 232 is calculated to be 20 m, and the maximum length specification for both legacy device 230 and legacy device 234 is 50 m. Since the wiring distances indicate that the number of mediation devices can be reduced while maintaining conformance with the maximum length specifications, optimal conformance does not exist between these wiring distances and the maximum length specifications. The number of mediation devices is optimized by deleting mediation device 236, connecting mediation device 232 to legacy device 230, and connecting mediation device 232 to legacy device 234, which is a configuration depicted in FIG. 2C. In this updated configuration in FIG. 2C, the wiring distances are less than or equal to the corresponding maximum length specifications (i.e., 15 m<50 m for legacy device 230 and 20 m<50 m for legacy device 234), while the number of mediation devices is reduced by one.

As another example regarding step 734, the configuration of FIG. 2C is taken as a starting point. In this example, the wiring distance between mediation device 232 (see FIG. 2C) and legacy device 234 (see FIG. 2C) is 60 m while the corresponding maximum length specification is 50 m. Since the wiring distance attribute exceeds the maximum length specification, the attribute does not optimally conform to its corresponding specification. In this case, the optimizing step 734 is performed by adding a mediation device to the CO, such as mediation device 236 (see FIG. 2B). In an updated configuration including the addition of mediation device 236 (see FIG. 2B), the distance from mediation device 236 to legacy device 234 is less than or equal to 50 m. Added mediation device 236 is then connected to legacy device 234 to provide the configuration shown in FIG. 2B. This addition of one mediation device restrains the increase of mediation devices to a minimum, while changing the wiring distance to be in conformance with the maximum length specification.

As an alternative to the example described above relative to optimization step 734, an existing mediation device (e.g., mediation device 228 in FIG. 2C) is connected to legacy device 234 (see FIG. 2C), if the adjusted wiring distance from the existing mediation device is less than or equal to the maximum length specification. As another alternative to the optimization step, mediation device 232 (see FIG. 2C) is moved closer to legacy device 234 (see FIG. 2C) so that the adjusted wiring distance between them is less than or equal to 50 m (i.e., the maximum length specification). To retain conformity with a maximum length specification associated with a second adjusted wiring distance between mediation device 232 (see FIG. 2C) and legacy device 230 (see FIG. 2C), the above-described move of mediation device 230 (see FIG. 2C) is limited to moves that prevent this second wiring distance from exceeding the maximum length specification associated with legacy device 230 (see FIG. 2C).

After step 734 is performed, inquiry step 732 is repeated so that another wiring distance that is not in optimal conformance with its corresponding specification can be modified. When inquiry step 732 determines that all wiring distances optimally conform to corresponding industry specifications, the optimization process moves to inquiry step 736.

Inquiry step 736 determines if any of the mediated legacy device bandwidth requirements are not in optimal conformance with its corresponding mediation device specification, then step 738 optimizes the number and/or placement of a mediation device to conform to the corresponding specification. In this case, a legacy device bandwidth requirement is the peak bandwidth capable of being sent from the legacy device. The corresponding mediation device specification is a maximum bandwidth specification that indicates the greatest amount of data capable of being received by a mediation device via all of its ports in a given unit of time. The optimal conformance of legacy device peak bandwidths to a corresponding maximum bandwidth specification indicates that the sum of peak bandwidths of all legacy devices connected to a mediation device is less than or equal to the maximum bandwidth specification associated with the mediation device, and the number of mediation devices is optimized.

As a first example relative to step 738 and starting with the CO configuration of FIG. 2B, the peak bandwidth from legacy device 230 (see FIG. 2B) is determined to be 2.4 kbps and the peak bandwidth from legacy device 234 (see FIG. 2B) is determined to be 3.6 kbps (e.g., as shown in column 616 in FIG. 6). The maximum bandwidth associated with mediation device 232 (see FIG. 2B) is 72 kbps (see, e.g., column 626 of FIG. 6). In this example, step 738 optimizes the number of mediation devices by deleting mediation device 236 (see FIG. 2B), connecting mediation device 232 (see FIG. 2C) to legacy device 230 (see FIG. 2C), and connecting mediation device 232 (see FIG. 2C) to legacy device 234 (see FIG. 2C). In this updated configuration, the sum of peak bandwidths for the legacy devices connected to mediation device 232 (see FIG. 2C) (i.e., 2.4 kbps+3.6 kbps or 6.0 kbps) is less than or equal to the maximum bandwidth specification of mediation device 232 (i.e., 72 kbps), while the number of mediation devices is optimized by being reduced by one.

As a second example relative to step 738, the configuration of FIG. 2C is taken as a starting point. In this example, the peak bandwidth from legacy device 230 (see FIG. 2C) is 70 kbps and the peak bandwidth from legacy device 234 (see FIG. 2C) is 19.2 kbps, while the corresponding maximum bandwidth specification of mediation device 232 (see FIG. 2C) is 72 kbps. Since the sum of the peak bandwidths of the legacy devices connected to the mediation device exceeds the maximum bandwidth specification (i.e., 70 kbps+19.2 kbps or 89.2 kbps is greater than 72 kbps), the peak bandwidth attribute does not optimally conform to its corresponding specification. In this example, the optimizing step 738 adds a mediation device to the CO and another mediation device is deleted. For instance, mediation device 232 (see FIG. 2C) is deleted and mediation device 252 (see FIG. 2D) is added to update the CO configuration from FIG. 2C to FIG. 2D. In this example, the maximum bandwidth specification of the added mediation device is 307 kbps. Added mediation device 252 (see FIG. 2D) is then connected to legacy devices 230 and 234 (see FIG. 2D). This replacement of one mediation device with another provides a configuration in which the sum of legacy device peak bandwidths associated with newly added mediation device 252 (see FIG. 2D) is in conformance with the maximum bandwidth specification, while avoiding an increase in the number of mediation devices.

As one alternative to the second example provided above relative to step 738, the peak bandwidth from legacy device 230 (see FIG. 2C) is 70 kbps and the peak bandwidth from legacy device 234 (see FIG. 2C) is 19.2 kbps, while the corresponding maximum bandwidth specification of mediation device 232 (see FIG. 2C) is 72 kbps. Again, for the reasons stated above, the peak bandwidth attribute does not optimally conform to its corresponding specification. In this alternative example, the optimizing step 738 adds a mediation device to the CO, such as mediation device 236 in an updated configuration shown in FIG. 2B, whose maximum bandwidth specification is 50 kbps. Added mediation device 236 (see FIG. 2B) is then connected to legacy device 234 (see FIG. 2B). This addition of a single mediation device restrains the increase of mediation devices to a minimum, while providing a configuration in which the peak bandwidths of legacy devices 230 and 234 (see FIG. 2B) are in conformance with the maximum bandwidth specifications of mediation devices 232 and 236 (see FIG. 2B), respectively.

If the preceding alternative had started with a set of more than two legacy devices connected to a first mediation device, then optimization step 738 includes adding a second mediation device, connecting a first subset of the original set of more than two legacy devices to the first mediation device, and connecting a second subset of the original set to the second mediation device, as long as the sum of peak bandwidths in the first subset is less than or equal to the maximum bandwidth of the first mediation device, and the sum of the peak bandwidths in the second subset is less than or equal to the maximum bandwidth of the second mediation device.

After step 738 is performed, inquiry step 732 is repeated to check if a wiring distance is not in optimal conformance with its corresponding specification. When inquiry step 732 determines that all wiring distances optimally conform to the corresponding specifications, the optimization process moves to repeat inquiry step 736, as described above. When all mediated legacy device bandwidth requirements are in optimal conformance with corresponding maximum bandwidth specifications, the optimization procedure moves to inquiry step 740.

Inquiry step 740 determines if the number of mediated legacy devices per mediation device optimally conforms to a corresponding mediation device specification. If there is a lack of optimal conformance related to a number of mediated legacy devices per mediation device, then step 742 optimizes the number and/or placement of mediation devices to conform to the corresponding specification. In this case, the number of mediated legacy devices per mediation device is the number or count of one or more mediated legacy devices to be connected to a mediation device. The mediation device specification that limits this count of legacy devices per mediation device is a maximum port capacity specification. The maximum port capacity specification of a mediation device is the number of ports of the mediation device, which equals the greatest number of legacy devices that can be connected to the mediation device at one time. The optimal conformance of a count of legacy devices connected to a mediation device to a corresponding maximum port capacity specification indicates that the count is less than or equal to the maximum port capacity, and the number of mediation devices is optimized.

As a first example relative to step 742, and which starts with the CO configuration in FIG. 2B, the counts of mediated legacy devices per mediation device is one for both mediation device 232 (see FIG. 2B) and mediation device 236 (see FIG. 2B). In this example, the maximum port capacity associated with mediation device 232 (see FIG. 2B) is four. In this case, the attribute compared to the maximum port capacity is the sum of the counts described above (i.e., 1 legacy device connected to mediation device 232 of FIG. 2B+1 mediation device connected to mediation device 236 of FIG. 2B=2). Since the sum is less than or equal to the corresponding maximum port capacity (i.e., 2<4), a mediation device can be deleted while preserving conformance with the maximum port capacity specification. In this example, step 742 optimizes the number of mediation devices by deleting a mediation device to change from the configuration in FIG. 2B to the configuration in FIG. 2C. In particular, step 742 deletes mediation device 236 (see FIG. 2B), connects mediation device 232 (see FIG. 2C) to legacy device 230 (see FIG. 2C), and connects mediation device 232 (see FIG. 2C) to legacy device 234 (see FIG. 2C). In this updated configuration, the count of mediated legacy devices connected to mediation device 232 (see FIG. 2C) is less than or equal to the maximum port capacity specification (i.e., 4) of mediation device 232 (see FIG. 2C), while the number of mediation devices is reduced by one.

As a second example relative to step 742, and which starts with the configuration of FIG. 2C, the count of legacy devices to be connected to mediation device 232 (see FIG. 2C) is two and the maximum port capacity of mediation device 232 (see FIG. 2C) is one. Since the count described above exceeds the maximum port capacity specification, the count attribute does not optimally conform to its corresponding specification. In this second example for the optimizing step 742, one mediation device is added to the CO, and another mediation device is deleted. For instance, mediation device 232 (see FIG. 2C) is deleted and mediation device 252 (see FIG. 2D) is added in an updated configuration shown in FIG. 2D. In this alternative, the maximum port capacity specification of newly added mediation device 252 (see FIG. 2D) is four. Added mediation device 252 (see FIG. 2D) is then connected to legacy devices 230 and 234 (see FIG. 2D). This replacement of mediation device 232 (see FIG. 2C) with mediation device 252 (see FIG. 2D) provides a configuration in which the count of legacy devices connected to a mediation device is in conformance with the maximum port capacity specification, while avoiding an increase in the number of mediation devices.

As one alternative to this second example relative to step 742, the count of legacy devices to mediation device 232 (see FIG. 2C) and maximum port capacity of mediation device 232 (see FIG. 2C) is the same as the previous example, which starts as the configuration depicted in FIG. 2C. Again, for the reasons stated above, optimal conformance is lacking. In this alternative, the optimizing step 742 adds a mediation device to update the configuration from FIG. 2C to FIG. 2B. The added mediation device 236 (see FIG. 2B) has a maximum port capacity of four, and is connected to legacy device 234 (see FIG. 2B). This addition of a single mediation device restrains the increase of mediation devices to a minimum, while providing a configuration in which counts of legacy devices connected to mediation devices 232, 236 (see FIG. 2B) are in conformance with their corresponding maximum port capacity specifications.

If the preceding alternative had started with a set of more than two legacy devices connected to mediation device 232 (see FIG. 2C), then the set can be divided into a first subset and a second subset. For instance, if the set includes five legacy devices, the first subset includes one legacy device and the second subset includes four legacy devices (not shown in FIG. 2C). The optimization step 742 includes adding mediation device 236 (see FIG. 2B) and connecting the one legacy device of the first subset to mediation device 232 (see FIG. 2B), and connecting the four legacy devices of the second subset to mediation device 236 (see FIG. 2B). In this case, the count (i.e., 1) of legacy devices connected to the first mediation device 232 is equal to the maximum port capacity of mediation device 232 (see FIG. 2B) and the count (i.e., 4) of legacy devices connected to mediation device 236 (see FIG. 2B) equals the maximum port capacity of mediation device 236 (see FIG. 2B), thereby conforming to the maximum port capacity specifications.

After step 742 is performed, inquiry step 732 is repeated, as described above. When inquiry step 732 determines that all wiring distances optimally conform to corresponding industry specifications, the optimization process moves to repeat inquiry step 736, as described above. When all mediated legacy device bandwidth requirements are in optimal conformance with corresponding maximum bandwidth specifications, inquiry step 740 is repeated, as described above. When all counts of mediated legacy devices per mediation devices optimally conform to corresponding maximum port capacity specifications, the optimization process continues at step 744.

Inquiry step 744 determines if the current configuration of mediation devices and legacy devices, as selected and connected by the previous steps of FIG. 7B, conforms with environmental and facilities specifications (hereinafter collectively referred to as CO specifications). CO specifications include standards or limitations associated with the following aspects provided by the CO: power (e.g., DC electric power), heating, ventilation, air conditioning and radio frequency interference. If the current configuration does not conform to the CO specifications, step 746 fixes or modifies the CO facility to provide conformance with the CO specifications and/or optimizes the number and/or placement of mediation devices to conform to the CO specifications.

For example, a mediation device placed in a particular location in the CO requires power, but no suitable power source is sufficiently close to the mediation device. This condition of non-conformance with CO specifications is resolved by, for instance, (1) moving the mediation device to be closer to a power source, (2) modifying or fixing the CO facility to include a power source near the location of the mediation device, or (3) deleting the mediation device, if one or more other, existing mediation devices that have access to power are capable of being connected to the legacy devices that were originally designated as being connected to the mediation device.

After step 746 is performed, the loops associated with inquiry steps 732, 736 and 740 are repeated in succession, as described above. When inquiry steps 732, 736, 740 determine that their respective attributes optimally conform with their respective specifications, and when the configuration of mediation devices and legacy devices conform to the CO specifications in step 744, an optimal number of mediation devices is determined, which reduces CO equipment costs. As a result of that optimization of mediation devices, the amount of wiring necessary in the CO configuration is an optimized amount that also reduces costs. Further, since the number of mediated legacy devices remains the same in the process described above, obtaining the optimized number of mediation devices also optimizes the ratio of mediation devices to mediated legacy devices. When the optimized configuration is determined, step 748 builds the intra-CO network according to the configuration, and the optimization process ends at step 750.

Computing System for CO Mediation Optimization

Figure 8:
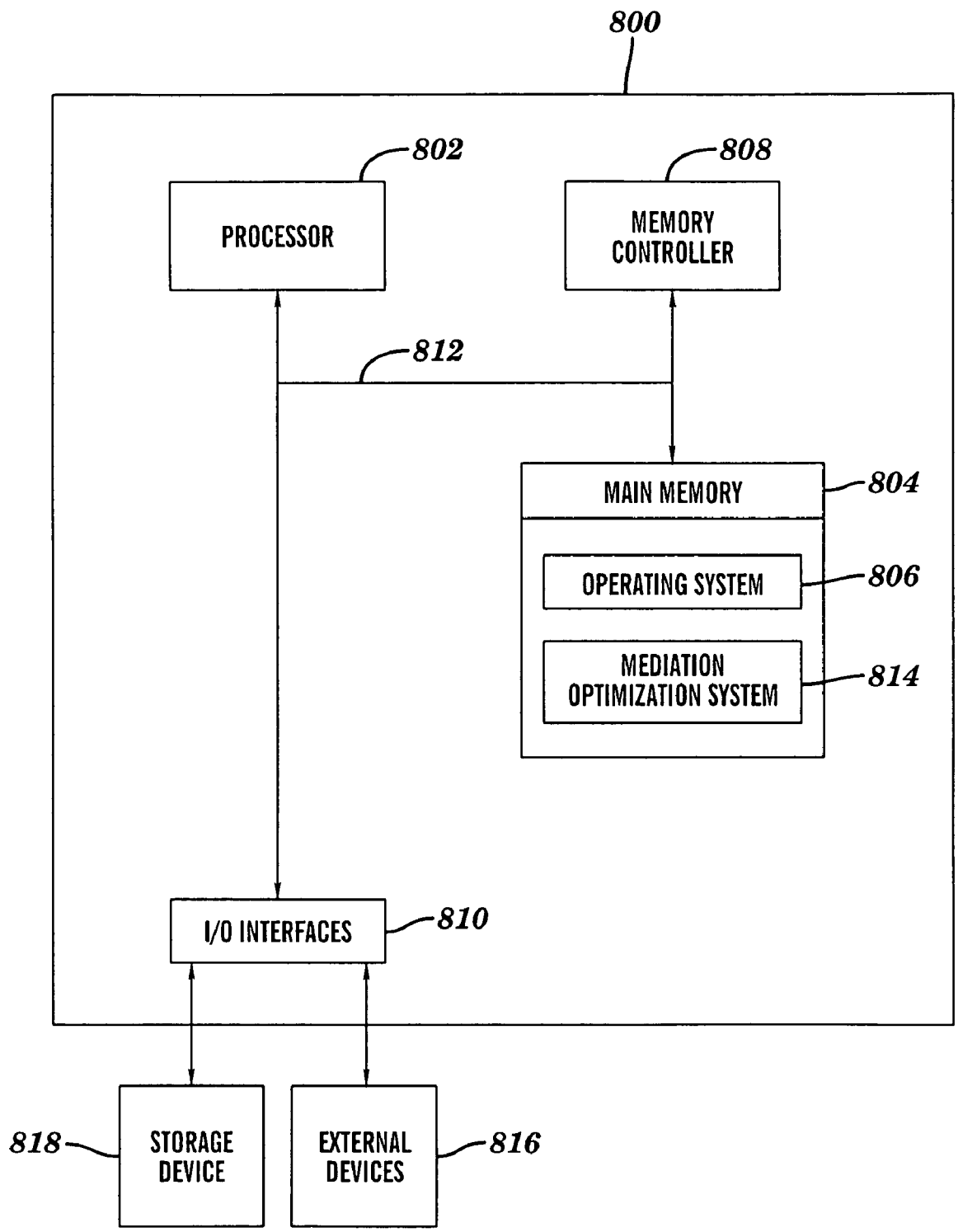
FIG. 8 is a block diagram of a system in which the optimization process in FIG. 3 can be implemented, in accordance with embodiments of the present invention.

FIG. 8 is a block diagram of a computing system in which the optimization process in FIG. 3 can be implemented, in accordance with embodiments of the present invention. Computer system 800 suitably comprises a processor 802, a main memory 804, an operating system 806 included in main memory 804, memory controller 808, and at least one input/output (I/O) interface 810. Processor 802, main memory 804, memory controller 808 and I/O interface(s) 810 are interconnected via a system bus 812. Main memory 804 also includes a mediation optimization system 814 that is, for example, a computer program including logic for optimizing mediation devices in a central office. In one embodiment, mediation optimization system 814 includes an algorithm of the logic of FIGS. 7A-7B.

Processor 802 performs computation and control functions of computer system 800, and comprises a suitable central processing unit. Processor 802 may comprise a single integrated circuit, such as a microprocessor, or may comprise any suitable number of integrated circuit devices and/or circuit boards working in cooperation to accomplish the functions of a processor. Processor 802 suitably executes one or more computer programs, including optimization system 814, within main memory 804. In one embodiment, processor 802 executes an algorithm implementing the logic depicted in the flow chart of FIGS. 7A-7B.

I/O interfaces 810 may comprise any system for exchanging information from external sources such as external devices 816. External devices 816 may comprise conventional external devices including a display monitor, keyboard, mouse, printer, plotter, facsimile, etc. Computer system 800 can be connected to one or more other computers via a communication interface using an appropriate communication channel (not shown) such as a modem communications path, a computer network, or the like. The computer network (not shown) may include a local area network (LAN), a wide area network (WAN), Intranet, and/or the Internet.

I/O interfaces 810 also allow computer system 800 to store and retrieve information (e.g., program instructions or data) from an auxiliary storage device 818, such as a non-volatile storage device, which can be, for example, a CD-ROM drive which receives a CD-ROM disk (not shown). Computer system 800 can store and retrieve information from other auxiliary storage devices (not shown), which can include a direct access storage device (DASD) (e.g., hard disk or floppy diskette), a magneto-optical disk drive, a tape drive, or a wireless communication device. Memory controller 808, through use of a processor (not shown) separate from processor 802, is responsible for moving requested information from main memory 804 and/or through I/O interfaces 810 to processor 802. While for the purposes of explanation, memory controller 808 is shown as a separate entity, those skilled in the art understand that, in practice, portions of the function provided by memory controller 808 may actually reside in the circuitry associated with processor 802, main memory 804, and/or I/O interfaces 810.

It should be understood that main memory 804 will not necessarily contain all parts of all mechanisms shown. For example, portions of mediation optimization system 814 and operating system 806 may be loaded into an instruction cache (not shown) for processor 802 to execute, while other files may well be stored on magnetic or optical disk storage devices, such as storage device 818. In addition, although mediation optimization system 814 is shown to reside in the same memory location as operating system 806, it is to be understood that main memory 804 may consist of disparate memory locations.

A terminal interface of I/O interfaces 810 allows system administrators and computer programmers to communicate with computer system 800. Although computer system 800 depicted in FIG. 8 contains only a single main processor 802 and a single system bus 812, it should be understood that the present invention applies equally to computer systems having multiple processors and multiple system buses. Similarly, although system bus 812 is a typical hardwired, multidrop bus, any connection means that supports bi-directional communication in a computer-related environment could be used.

A computer system 800 in accordance with the present invention is, for example, a personal computer. However, those skilled in the art will appreciate that the methods and apparatus of the present invention apply equally to any computer system, regardless of whether the computer system is a complicated multi-user computing apparatus or a single user device such as a workstation.

Note that various modifications, additions, or deletions may be made to computer system 800 illustrated in FIG. 8 within the scope of the present invention such as the addition of cache memory or other peripheral devices. FIG. 8 is presented to simply illustrate some of the salient features of computer system 800.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include recordable type media such as floppy disks and CD-ROMs, and transmission type media such as digital and analog communication links, including wireless communication links.

Thus, the present invention discloses a method for deploying or integrating computing infrastructure, comprising integrating computer-readable code into computer system 800, wherein the code in combination with computer system 800 is capable of performing a process of optimizing a number of mediation devices in a central office.

The present invention can be included, for example, in an article of manufacture (e.g., one or more computer program products) having, for instance, computer usable media. This media has embodied therein, for instance, computer-readable program code means for providing and facilitating the capabilities of the present invention. The article of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of optimizing a configuration of a plurality of devices in a central office in a telecommunications environment, said method comprising:

obtaining a plurality of specifications, each specification being associated with a mediation device of a plurality of mediation devices;

generating a configuration of said plurality of mediation devices and a plurality of legacy devices in a central office;

comparing a first specification of said plurality of specifications to a first attribute of a first mediation device of said plurality of mediation devices, wherein said first specification is a first maximum length indicating a length of a communication link capable of connecting said first mediation device to a first legacy device of a first set of one or more legacy devices of said plurality of legacy devices, wherein a second maximum length indicates a length of a communication link capable of connecting a second mediation device of said plurality of mediation devices to a second legacy device of a second set of one or more legacy devices of said plurality of legacy devices, wherein said first attribute is a first distance between said first legacy device and said first mediation device, said first legacy device to be connected to said first mediation device in said configuration; and updating said configuration responsive to said comparing said first specification, wherein said updating facilitates providing an optimized number of mediation devices in said plurality of mediation devices, and wherein said first distance between said first mediation device and said first legacy device exceeds said first maximum length, said updating being selected from the group consisting of:

adding a third mediation device to said plurality of mediation devices and connecting said third mediation device to said first legacy device, wherein a distance from said third mediation device to said first legacy device is less than or equal to said first maximum length, connecting said second mediation device to said first legacy device, wherein a distance from said second mediation device to said first legacy device is less than or equal to said first maximum length, and moving said first mediation device and connecting said first mediation device to said first legacy device, said moving updating said first distance to be less than or equal to said first maximum length.

2. The method of claim 1, further comprising:

comparing a second specification of said plurality of specifications to a second attribute of said first mediation device, wherein said second specification is a maximum bandwidth indicating an amount of data capable of being received by said first mediation device, wherein said second attribute is a first amount of data to be received by said first mediation device from at least one legacy device of said plurality of legacy devices, said at least one legacy device to be connected to said first mediation device in said configuration, and wherein said first amount of data to be received by said first mediation device exceeds said maximum bandwidth; and updating said configuration responsive to said comparing said second specification, said updating responsive to said comparing said second specification being selected from the group consisting of:

adding a fourth mediation device to said plurality of mediation devices, deleting said first mediation device and connecting said fourth mediation device to said first set; and adding said fourth mediation device, connecting said fourth mediation device to a first subset of at least one legacy device of said first set, and connecting said first mediation device to a second subset of at least one legacy device of said first set.

3. The method of claim 1, further comprising:

comparing a third specification of said plurality of specifications to a third attribute of said first mediation device, wherein said third specification is a maximum port capacity indicating a number of legacy devices of said plurality of legacy devices capable of being connected to said first mediation device, wherein said third attribute is a first count of said at least one legacy device to be connected to said first mediation device in said configuration, and wherein said first count exceeds said maximum port capacity; and updating said configuration responsive to said comparing said third specification, said updating responsive to said comparing said third specification being selected from the group consisting of:

adding a fourth mediation device to said plurality of mediation devices, deleting said first mediation device, and connecting said fourth mediation device to said first set; and adding said fourth mediation device to said plurality of mediation devices, connecting said fourth mediation device to a first subset of at least one legacy device of said first set, and connecting said first mediation device to a second subset of at least one legacy device of said first set.

4. A system for optimizing a configuration of a plurality of devices in a central office in a telecommunications environment, said system comprising:

means for obtaining a plurality of specifications, each specification being associated with a mediation device of a plurality of mediation devices;

means for generating a configuration of said plurality of mediation devices and a plurality of legacy devices in a central office;

means for comparing a first specification of said plurality of specifications to a first attribute of a first mediation device of said plurality of mediation devices, wherein said first specification is a first maximum length indicating a length of a communication link capable of connecting said first mediation device to a first legacy device of a first set of one or more legacy devices of said plurality of legacy devices, wherein a second maximum length indicates a length of a communication link capable of connecting a second mediation device of said plurality of mediation devices to a second legacy device of a second set of one or more legacy devices of said plurality of legacy devices, wherein said first attribute is a first distance between said first legacy device and said first mediation device, said first legacy device to be connected to said first mediation device in said configuration; and means for updating said configuration responsive to said comparing said first specification, wherein said updating facilitates providing an optimized number of mediation devices in said plurality of mediation devices, and wherein said first distance between said first mediation device and said first legacy device exceeds said first maximum length, said means for updating being selected from the group consisting of:

means for adding a third mediation device to said plurality of mediation devices and means for connecting said third mediation device to said first legacy device, wherein a distance from said third mediation device to said first legacy device is less than or equal to said first maximum length, means for connecting said second mediation device to said first legacy device, wherein a distance from said second mediation device to said first legacy device is less than or equal to said first maximum length, and means for moving said first mediation device and means for connecting said first mediation device to said first legacy device, said moving updating said first distance to be less than or equal to said first maximum length.

5. The system of claim 4, further comprising:

means for comparing a second specification of said plurality of specifications to a second attribute of said first mediation device, wherein said second specification is a maximum bandwidth indicating an amount of data capable of being received by said first mediation device, wherein said second attribute is a first amount of data to be received by said first mediation device from at least one legacy device of said plurality of legacy devices, said at least one legacy device to be connected to said first mediation device in said configuration, and wherein said first amount of data to be received by said first mediation device exceeds said maximum bandwidth; and means for updating said configuration responsive to said comparing said second specification, said means for updating responsive to said comparing said second specification being selected from the group consisting of:

means for adding a fourth mediation device to said plurality of mediation devices, means for deleting said first mediation device and means for connecting said fourth mediation device to said first set; and means for adding said fourth mediation device, means for connecting said fourth mediation device to a first subset of at least one legacy device of said first set, and means for connecting said first mediation device to a second subset of at least one legacy device of said first set.

6. The system of claim 4, further comprising:

means for comparing a third specification of said plurality of specifications to a third attribute of said first mediation device, wherein said third specification is a maximum port capacity indicating a number of legacy devices of said plurality of legacy devices capable of being connected to said first mediation device, wherein said third attribute is a first count of said at least one legacy device to be connected to said mediation device in said configuration, and wherein said first count exceeds said maximum port capacity; and means for updating said configuration responsive to said comparing said third specification, said means for updating responsive to said comparing said third specification being selected from the group consisting of:

means for adding a fourth mediation device to said plurality of mediation devices, means for deleting said first mediation device, and means for connecting said fourth mediation device to said first set; and means for adding said fourth mediation device to said plurality of mediation devices, means for connecting said fourth mediation device to a first subset of at least one legacy device of said first set, and means for connecting said first mediation device to a second subset of at least one legacy device of said first set.

7. At least one program storage device readable by a machine, tangibly embodying at least one program of instructions executable by the machine to perform a method of optimizing a configuration of a plurality of devices in a central office in a telecommunications environment, said method comprising:

obtaining a plurality of specifications, each specification being associated with a mediation device of a plurality of mediation devices;

generating a configuration of said plurality of mediation devices and a plurality of legacy devices in a central office;

comparing a first specification of said plurality of specifications to a first attribute of a first mediation device of said plurality of mediation devices, wherein said first specification is a first maximum length indicating a length of a communication link capable of connecting said first mediation device to a first legacy device of a first set of one or more legacy devices of said plurality of legacy devices, wherein a second maximum length indicates a length of a communication link capable of connecting a second mediation device of said plurality of mediation devices to a second legacy device of a second set of one or more legacy devices of said plurality of legacy devices, wherein said first attribute is a first distance between said first legacy device and said first mediation device, said first legacy device to be connected to said first mediation device in said configuration; and updating said configuration responsive to said comparing said first specification, wherein said updating facilitates providing an optimized number of mediation devices in said plurality of mediation devices, and wherein said first distance between said first mediation device and said first legacy device exceeds said first maximum length, said updating being selected from the group consisting of:

adding a third mediation device to said plurality of mediation devices and connecting said third mediation device to said first legacy device, wherein a distance from said third mediation device to said first legacy device is less than or equal to said first maximum length, connecting said second mediation device to said first legacy device, wherein a distance from said second mediation device to said first legacy device is less than or equal to said first maximum length, and moving said first mediation device and connecting said first mediation device to said first legacy device, said moving updating said first distance to be less than or equal to said first maximum length.

8. The at least one program storage device of claim 7, further comprising:

comparing a second specification of said plurality of specifications to a second attribute of said first mediation device, wherein said second specification is a maximum bandwidth indicating an amount of data capable of being received by said first mediation device, wherein said second attribute is a first amount of data to be received by said first mediation device from at least one legacy device of said plurality of legacy devices, said at least one legacy device to be connected to said first mediation device in said configuration, and wherein said first amount of data to be received by said first mediation device exceeds said maximum bandwidth; and updating said configuration responsive to said comparing said second specification, said updating responsive to said comparing said second specification being selected from the group consisting of:

adding a fourth mediation device to said plurality of mediation devices, deleting said first mediation device and connecting said fourth mediation device to said first set; and adding said fourth mediation device, connecting said fourth mediation device to a first subset of at least one legacy device of said first set, and connecting said first mediation device to a second subset of at least one legacy device of said first set.

9. The at least one program storage device of claim 7, further comprising:

comparing a third specification of said plurality of specifications to a third attribute of said first mediation device, wherein said third specification is a maximum port capacity indicating a number of legacy devices of said plurality of legacy devices capable of being connected to said first mediation device, wherein said third attribute is a first count of said at least one legacy device to be connected to said first mediation device in said configuration, and wherein said first count exceeds said maximum port capacity; and updating said configuration responsive to said comparing said third specification, said updating responsive to said comparing said third specification being selected from the group consisting of:

adding a fourth mediation device to said plurality of mediation devices, deleting said first mediation device, and connecting said fourth mediation device to said first set; and adding said fourth mediation device to said plurality of mediation devices, connecting said fourth mediation device to a first subset of at least one legacy device of said first set, and connecting said first mediation device to a second subset of at least one legacy device of said first set.

* * * * *